US012614688B2

(12) United States Patent
Cui

(10) Patent No.: US 12,614,688 B2
(45) Date of Patent: Apr. 28, 2026

(54) INTELLIGENT CONTACTOR

(71) Applicant: Ningbo Lianda Winch Co., Ltd., Ningbo City (CN)

(72) Inventor: Xiaojun Cui, Ningbo City (CN)

(73) Assignee: NINGBO LIANDA WINCH CO., LTD., Ningbo City (CN)

(*) Notice: Subject to any disclaimer, the term of this patent is extended or adjusted under 35 U.S.C. 154(b) by 320 days.

(21) Appl. No.: 18/500,044

(22) Filed: Nov. 1, 2023

(65) Prior Publication Data

US 2024/0429011 A1 Dec. 26, 2024

(30) Foreign Application Priority Data

Jun. 26, 2023 (CN) ......................... 202321640353.9

(51) Int. Cl.

*H01H 50/18* (2006.01)
*H01H 47/02* (2006.01)
*H01H 50/14* (2006.01)
*H01H 50/56* (2006.01)

(52) U.S. Cl.

CPC ............ *H01H 50/18* (2013.01); *H01H 47/02* (2013.01); *H01H 50/14* (2013.01); *H01H 50/56* (2013.01)

(58) Field of Classification Search

CPC ........ H01H 50/18; H01H 47/02; H01H 50/14; H01H 50/56; H01H 50/546

See application file for complete search history.

(56) References Cited

U.S. PATENT DOCUMENTS

2012/0019340 A1* 1/2012 Ramezanian ............ H01H 9/04 335/2
2013/0257567 A1* 10/2013 Takaya ................... H01H 50/38 335/133
2015/0206684 A1* 7/2015 Naka ........................ H01H 1/50 335/187
2019/0122844 A1* 4/2019 Minowa ................. H01H 50/58
2021/0249210 A1* 8/2021 Grunack ................ H01H 51/28

* cited by examiner

*Primary Examiner* — Thienvu V Tran
*Assistant Examiner* — Muaamar Qahtan Al-Taweel
(74) *Attorney, Agent, or Firm* — Getech Law LLC; Jun Ye

(57) ABSTRACT

An intelligent contactor is provided which comprises a contactor body, and the contactor body is provided with a first conductive piece and a second conductive piece partially protruding out of the contactor body. A current splitter for measuring a current flowing through the first conductive piece and the second conductive piece is arranged inside the contactor body; an electromagnetic system for controlling one end of the current splitter and a circuit board for controlling the electromagnetic system. The other end of the current splitter is electrically connected to the second conductive piece. A partition plate is vertically and fixedly connected inside the contactor body, and the partition plate is used to partition the interior of the contactor body into a first accommodation chamber and a second accommodating chamber to address the problem of inability of a contactor in the prior arts to perform power cutoff for an over-current case.

9 Claims, 4 Drawing Sheets

INTELLIGENT CONTACTOR

This application is based upon and claims priority to Chinese Patent Application No. 202321640353.9, filed on Jun. 26, 2023, the entire contents of which are incorporated herein by reference.

TECHNICAL FIELD

The present invention relates to the field of contactor technologies, and in particular to an intelligent contactor.

BACKGROUND

Along with scientific and technological development, there are more and more electronic elements and devices. A contactor is a device capable of quickly cutting off an alternating current or direct current main circuit and frequently turning on or off large current control circuit, which is usually used as an electromagnetic switch in the control of high voltage by low voltage.

In the prior arts, the contactor is comprised of an electromagnetic system and two connection columns. The contactor is usually series-connected in a circuit. Specifically, a wire connected to a load is firstly connected to one of the two connection columns, and the other connection column is then connected to the load, and then the electromagnetic system is controlled to work such that the two connection columns can be connected or disconnected, achieving quick control on whether to allow the load to work.

However, the existing contactor can be used as electromagnetic switch only and cannot autonomously carry out power cutoff upon occurrence of an over-current abnormal state of a load circuit.

SUMMARY

The technical problem to be solved by the present invention is to provide an intelligent contactor so as to address the problem of inability of a contactor in the prior arts to perform power cutoff for an over-current case.

A technical solution employed in the present invention to solve the above problem is described below: there is provided an intelligent contactor, comprising a contactor body. The contactor body is provided with a first conductive piece and a second conductive piece partially protruding out of the contactor body. A current splitter for measuring a current flowing through the first conductive piece and the second conductive piece is arranged inside the contactor body; an electromagnetic system for controlling one end of the current splitter to be connected or disconnected with the first conductive piece, and a circuit board for controlling the electromagnetic system to be turned on or off based on a current value measured by the current splitter. The other end of the current splitter is electrically connected to the second conductive piece. A partition plate is vertically and fixedly connected inside the contactor body, and the partition plate is used to partition the interior of the contactor body into a first accommodation chamber for accommodating and fixing the electromagnetic system and a second accommodating chamber for accommodating and fixing the circuit board.

Compared with the prior arts, the present invention has the following advantages: the current splitter, the circuit board and the electromagnetic system are fixedly disposed inside the contactor body; a current flowing between the first conductive piece and the second conductive piece on the contactor body is collected by using the current splitter; the circuit board then controls the electromagnetic system to be turned on or off based on a current value collected by the current splitter, thereby achieving automatic over-current cutoff and protecting a load circuit.

Preferably, a screw is disposed on the contactor body, and the screw penetrates through the contactor body to be fixedly connected with one end of the current splitter; the second conductive piece penetrates through the other end of the current splitter and fixes the other end of the current splitter inside the contactor body.

The following technical effect can be achieved by using the technical solution: the current splitter can be fixed by using the screw and the second conductive piece, and furthermore, the second conductive piece can be electrically connected with the current splitter, eliminating the need of disposal of other wires, and leading to simple structure and convenient fixing.

Preferably, a third sealing gasket for fixing the screw to the contactor body is sleeved on the screw.

The following technical effect can be achieved by using the technical solution: with disposal of the third sealing gasket, the contactor body and the screw can be fixed closely to prevent entry of other foreign matters into the contactor body.

Preferably, the electromagnetic system comprises an annular coil in electrical connection with the circuit board, a movable iron core, a movable contact sheet for controlling one end of the current splitter to be connected or disconnected with the first conductive piece, and a spring. The annular coil is fixed inside the first accommodating chamber. The movable contact sheet is disposed above the annular coil. One end of the spring is fixedly connected to an inner wall of the contactor body, and the other end of the spring is fixedly connected to one end of the movable iron core. One end of the movable iron core is fixedly connected to the movable contact sheet and the other end of the movable iron core is disposed in a cavity inside the annular coil.

The following technical effect can be achieved by using the technical solution: the movable iron core can move after the annular coil is energized, so as to bring the movable contact sheet to connect one end of the current splitter with the first conductive piece; after the annular coil is de-energized, the movable iron core can be reset by using an elastic force of the spring to cut off the connection, thus helping to control one end of the current splitter to be connected or disconnected with the first conductive piece.

Preferably, an insulation plate is further disposed between the annular coil and the movable contact sheet. The insulation plate is fixedly connected with a sidewall of the first accommodating chamber. The other end of the movable iron core penetrates through the insulation plate and is disposed in the cavity inside the annular coil. An elastic piece is further disposed at a side of the insulation plate close to the movable contact sheet.

The following technical effect can be achieved by using the technical solution: when the current of the annular coil is cut off, the movable iron core can be reset under the elastic force of the spring and the movable contact sheet also can be reset quickly; with disposal of the elastic piece, the movement of the movable contact sheet can be buffered, avoiding strong impact; the insulation plate, on the one hand, achieves supporting effect on the elastic piece, on the other hand, prevents the movable contact sheet from resetting to strongly impact the annular coil. In this way, short-circuiting resulting from the coming-off of the paint on the surface of the annular coil can be avoided.

Preferably, inside the circuit board are disposed a collection circuit for collecting a current of the current splitter, a threshold current setting circuit for setting a threshold current, a power supply circuit, a control circuit for controlling the power supply circuit to connect with the electromagnetic system, and a main control chip U1 for processing signals. The collection circuit, the threshold current setting circuit and the control circuit are all electrically connected to the main control chip U1 which is electrically connected to the power supply circuit.

The following technical effect can be achieved by using the technical solution: the main control chip U1 compares the current value collected by the collection circuit with the threshold current of the threshold current setting circuit to determine whether the electromagnetic system works, and hence further connect or disconnect the first conductive piece and the second conductive piece, helping turn on or off the intelligent contactor by setting different thresholds for different currents.

Preferably, the collection circuit comprises an amplifier U3, a slide rheostat RS1, a resistor R7, a resistor R8, a resistor R9, a resistor R10, a resistor R11, a capacitor C6 and a capacitor C5. One end of the current splitter is electrically connected to a grounding end, and the other end of the current splitter is electrically connected to a non-inverting input end of the amplifier U32 through the resistor R10. The non-inverting input end of the amplifier U3 is electrically connected to a power supply end of the main control chip U1 through the resistor R11, and also electrically connected with the grounding end through the capacitor C6. An inverting input end of the amplifier U3 is electrically connected to the grounding end through the resistor R8 and also series-connected with the resistor R7 and the slide rheostat RS1 to electrically connect with an output end of the amplifier U3. A slide end pin of the slide rheostat RS1 is electrically connected to a fixed pin of one end of the slide rheostat RS1. The output end of the amplifier U3 is series-connected with the resistor R9 to electrically connect with the main control chip U1. The resistor R9 and a connection end of the main control chip U1 are electrically connected to the grounding end through the capacitor C5.

The following technical effect can be achieved by using the technical solution: by using the amplifier U3, the data of the current splitter can be collected in an amplifying way to help the comparison of the main control chip U1.

Preferably, the control circuit comprises an optical coupler U4, a diode D1, a transient diode D2, a Zener diode ZD1, a PMOS transistor M1, a capacitor C1, a capacitor C2, a resistor R1, a resistor R2 and a resistor R3. A power input end of the power supply circuit is electrically connected to a source electrode of the PMOS transistor M1; the source electrode of the PMOS transistor M1 is electrically connected to a negative pole of the transient diode D2; a positive pole of the eltransient diode D2 is grounded; the transient diode D2 is parallel-connected with the capacitor C2; the source electrode of the PMOS transistor M1 is electrically connected to a negative pole of the Zener diode ZD1; a positive pole of the Zener diode ZD1 is electrically connected with a gate electrode of the PMOS transistor M1; the Zener diode ZD1 is parallel-connected with the resistor R1; the gate electrode of the PMOS transistor M1 is electrically connected with a collector electrode of the optical coupler U4 through the resistor R2; an emitter electrode of the optical coupler U4 is grounded; a positive pole of the optical coupler U4 is electrically connected to a power supply end of the main control chip U1; a negative pole of the optical coupler U4 is electrically connected to the main control chip U1 through the resistor R3; a drain electrode of the PMOS transistor M1 is electrically connected to one end of the annular coil; the drain electrode of the PMOS transistor M1 is electrically connected to a negative pole of the diode D1; a positive pole of the diode D1 is grounded; the diode D1 is parallel-connected with the capacitor C1; and the other end of the annular coil is grounded.

The following technical effect can be achieved by using the technical solution: with the optical coupler and the PMOS transistor, the main control chip U1 can output signals to control the power supply of the power supply circuit to be connected to the annular coil or not, bringing convenience to the control.

Preferably, a first flat washer, a first spring washer and a first nut are sequentially sleeved on the first conductive piece outside the contactor body, and the first nut is thread-connected with the first conductive piece; a second flat washer, a second spring washer and a second nut are sequentially sleeved on the second conductive piece outside the contactor body, and the second nut is thread-connected with the second conductive piece.

The following technical effect can be achieved by using the technical solution: with disposal of the flat washers, the spring washers and the nuts, the first conductive piece and the second conductive piece can be helped to be fixedly connected to an external wire.

Preferably, a first sealing gasket for fixing the first flat washer to the contactor body is sleeved on the first conductive piece and a second sealing gasket for fixing the second flat washer to the contactor body is sleeved on the second conductive piece.

The following technical effect can be achieved by using the technical solution: with disposal of the first sealing gasket and the second sealing gasket, external dusts and water vapors and the like can be prevented from entering the contactor body.

Numerals of the drawings are described below:

1. contactor body, 11. first accommodating chamber, 12. second accommodating chamber,

13. base, 14. top cover, and 15. fourth sealing gasket;

2. first conductive piece, 21. first flat washer, 22. first spring washer, 23. first nut, 24. first sealing gasket;

3. second conductive piece, 31. second flat washer, 32. second spring washer, 33. second nut, 34. second sealing gasket;

4. current splitter;

5. electromagnetic system, 51. annular coil, 52. movable iron core, 53. movable contact sheet, 54. spring, 56. insulation plate, and 55. elastic piece;

6. circuit board;

7. screw, and 71. third sealing gasket.

EMBODIMENTS

In order to make the objects, features and advantages of the present invention clearer and more intelligible, the specific embodiments of the present invention will be detailed below in combination with drawings.

Figure 1:
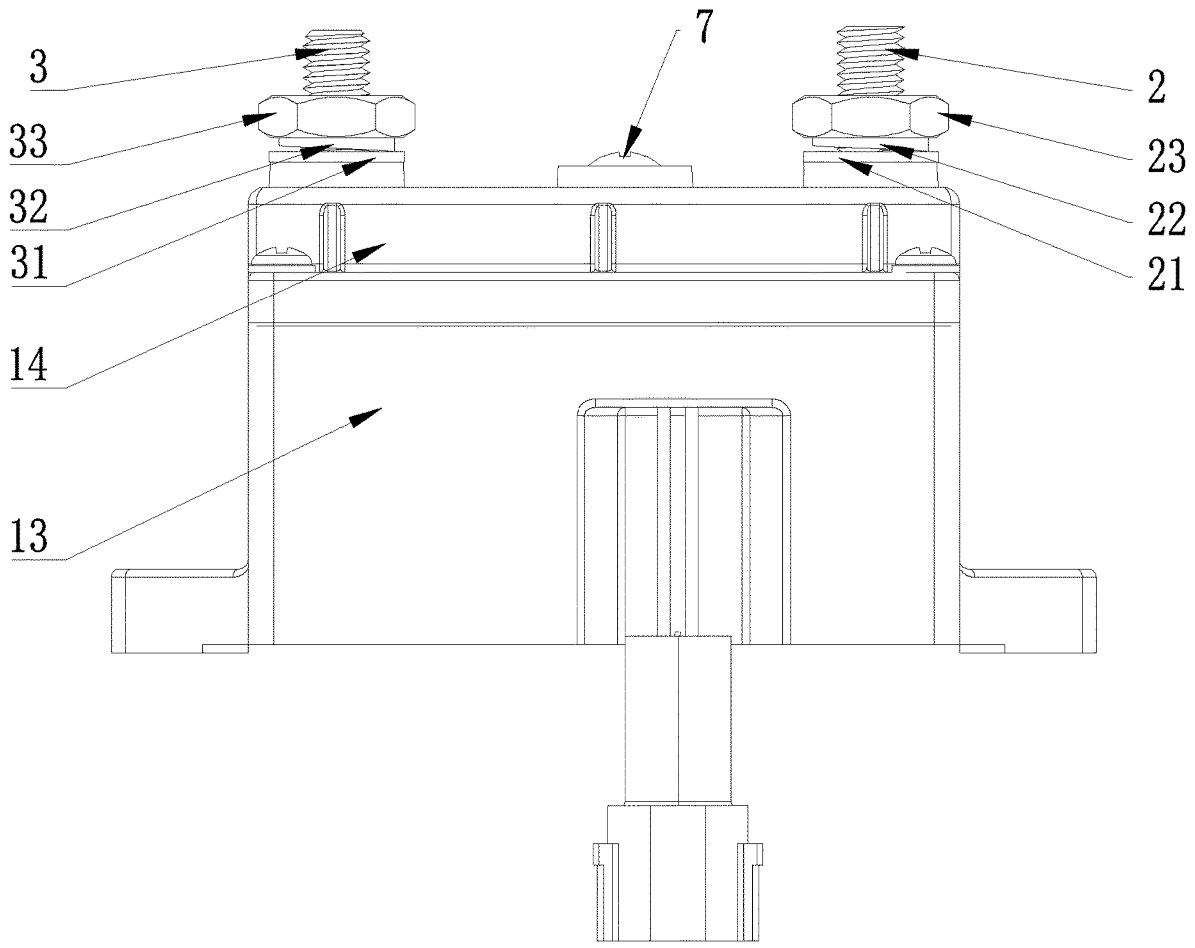
FIG. 1 is a schematic diagram illustrating an entire structure of an intelligent contactor according to the present invention.
Figure 2:
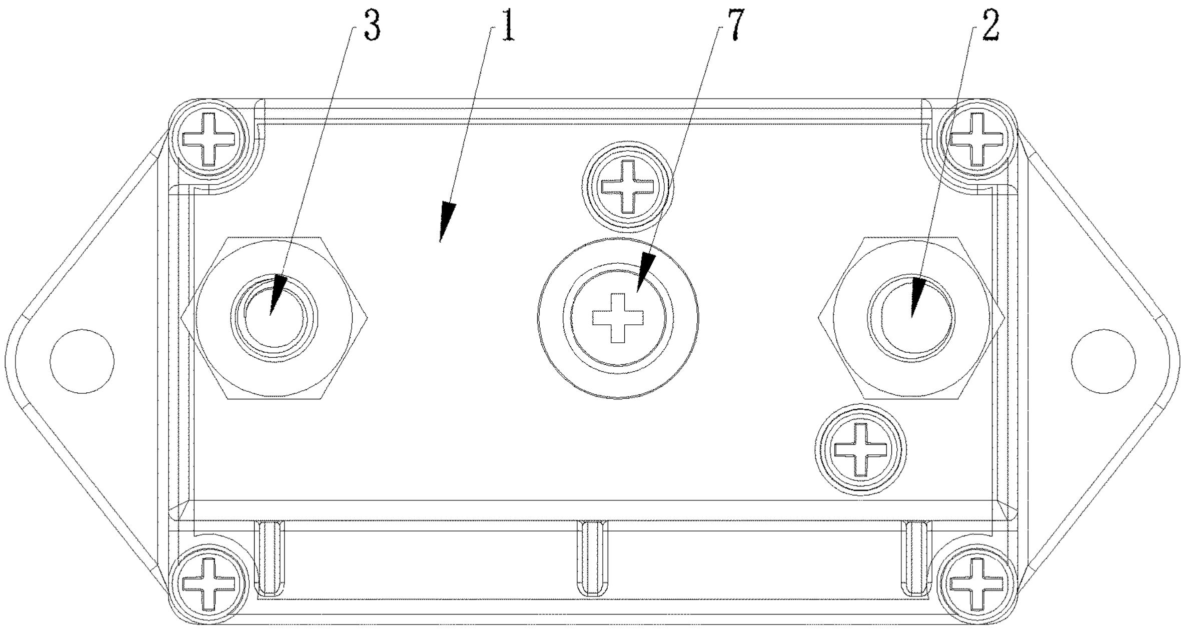
FIG. 2 is a top view of an intelligent contactor according to the present invention.
Figure 3:
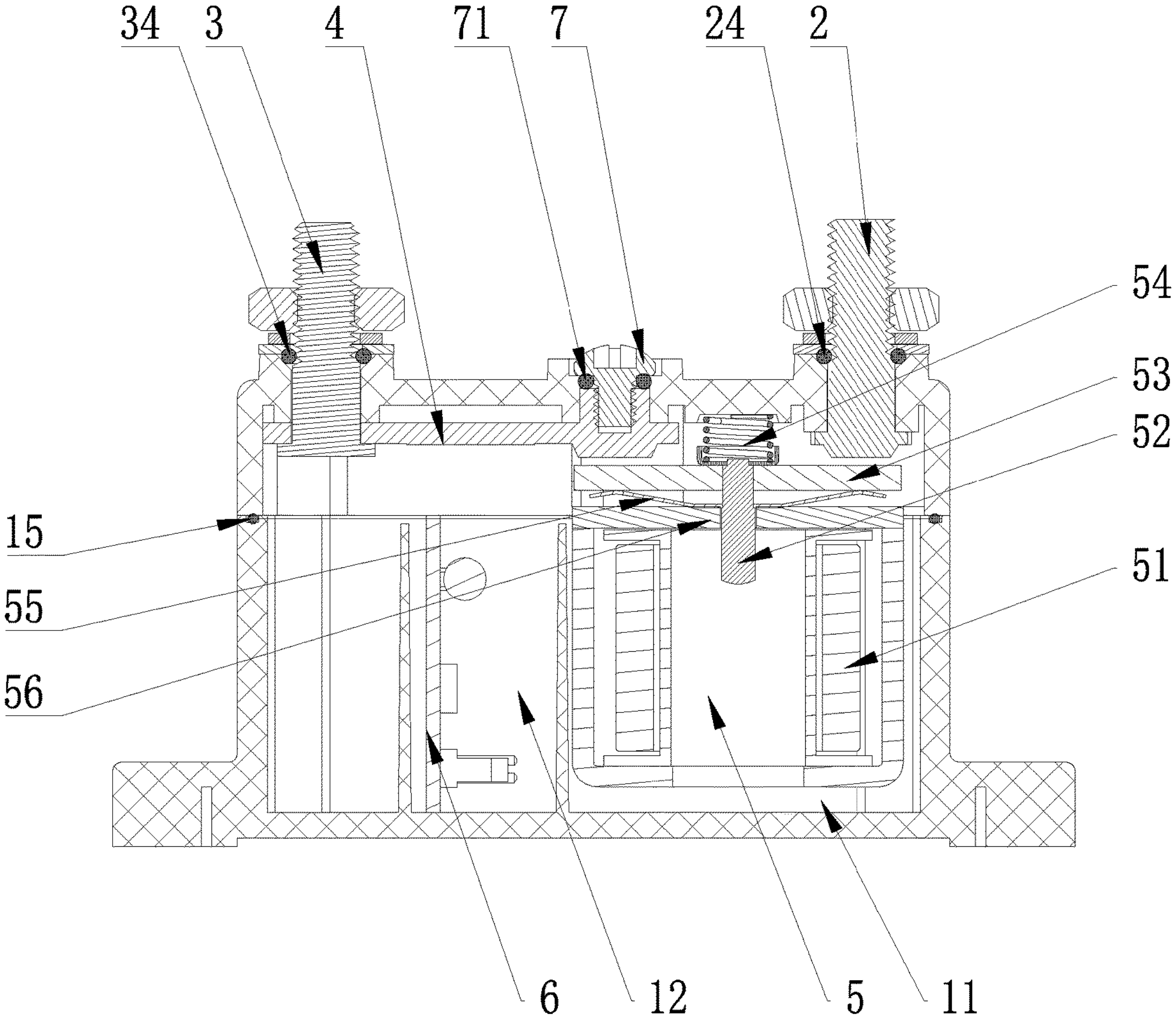
FIG. 3 is a sectional view of an intelligent contactor according to the present invention.
Figure 4:
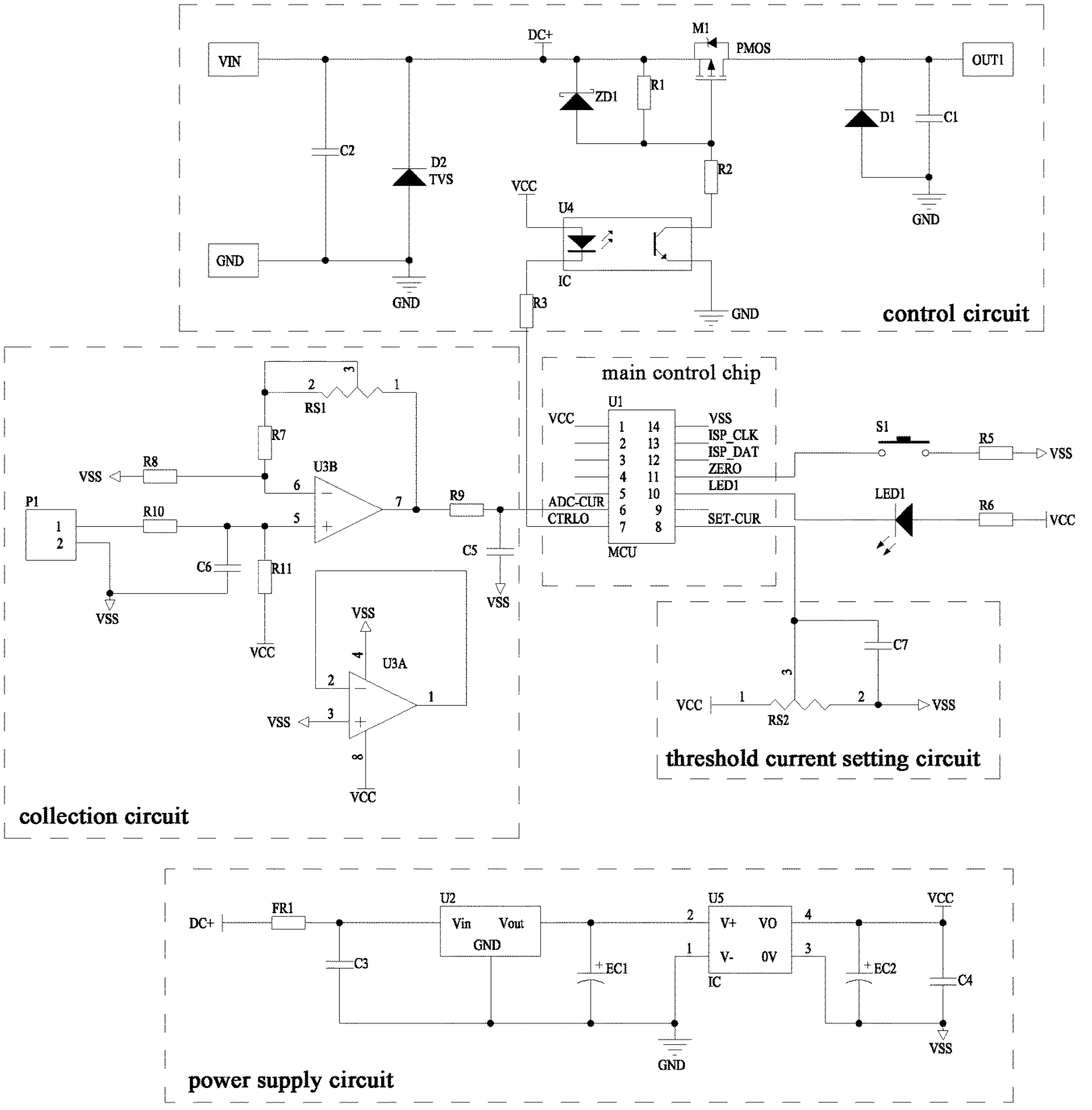
FIG. 4 is a schematic diagram illustrating a circuit in a circuit board of an intelligent contactor according to the present invention.

As shown in FIGS. 1 to 4, one or more embodiments provide an intelligent contactor, which comprises a contactor body 1. The contactor body 1 comprises a base 13 and a top cover 14, and a fourth sealing gasket 15 is disposed between the base 13 and the top cover 14.

A first conductive piece 2 and a second conductive piece 3 partially protruding out of the top cover 14 are disposed on the top cover 14.

A first flat washer 21, a first spring washer 22 and a first nut 23 are sequentially sleeved on the first conductive piece 2 outside the top cover 14, and the first nut 23 is thread-connected with the first conductive piece 2.

A second flat washer 31, a second spring washer 32, and a second nut 33 are sequentially sleeved on the second conductive piece 3 outside the top cover 14, and the second nut 33 is thread-connected with the second conductive piece 3.

With disposal of the flat washers, the spring washers and the nuts, the first conductive piece and the second conductive piece can be helped to be fixedly connected to an external wire.

Furthermore, a first sealing gasket 24 for fixing the first flat washer 21 to the top cover 14 is sleeved on the first conductive piece 2 and a second sealing gasket 34 for fixing the second flat washer 31 to the top cover 14 is sleeved on the second conductive piece 3.

With disposal of the first sealing gasket 24 and the second sealing gasket 34, external dusts and water vapors and the like can be prevented from entering the contactor body 1.

In this embodiment, inside the contactor body 1 are fixed a current splitter 4 for measuring a current flowing through the first conductive piece 2 and the second conductive piece 3, an electromagnetic system 5 for controlling one end of the current splitter 4 to be connected or disconnected with the first conductive piece 2, and a circuit board 6 for controlling the electromagnetic system 5 to be turned on or off based on a current value measured by the current splitter 4. The other end of the current splitter 4 is electrically connected to the second conductive piece 3.

A partition plate is vertically and fixedly connected inside the base 13, and the partition plate is used to partition the interior of the base 13 into a first accommodation chamber 11 for accommodating and fixing the electromagnetic system 5 and a second accommodating chamber 12 for accommodating and fixing the circuit board 6.

The current splitter 4, the circuit board 6 and the electromagnetic system 5 are fixedly disposed inside the contactor body 1; a current flowing between the first conductive piece 2 and the second conductive piece 3 on the contactor body 1 is collected by using the current splitter 4; the circuit board 6 then controls the electromagnetic system 5 to be turned on or off based on a current value collected by the current splitter 4, thereby achieving automatic over-current cutoff and protecting a load circuit.

In the present embodiment, a screw 7 is disposed on the contactor body 1, and the screw 7 penetrates through the contactor body 1 to be fixedly connected with one end of the current splitter 4; the second conductive piece 3 penetrates through the other end of the current splitter 4 and fixes the other end of the current splitter 4 to an inner top wall of the contactor body 1.

The current splitter 4 can be fixed by using the screw 7 and the second conductive piece 3, and furthermore, the second conductive piece 3 can be electrically connected with the current splitter 4, eliminating the need of disposal of other wires, and leading to simple structure and convenient fixing.

A third sealing gasket 71 for fixing the screw 7 to the contactor body 1 is sleeved on the screw 7. With disposal of the third sealing gasket 71, the contactor body 1 and the screw 7 can be connected tightly to prevent entry of other foreign matters into the contactor body 1.

In the present embodiment, the electromagnetic system 5 comprises an annular coil 51 in electrical connection with the circuit board 6, a movable iron core 52, a movable contact sheet 53 for controlling one end of the current splitter 4 to be connected or disconnected with the first conductive piece 2, and a spring 54. The annular coil 51 is fixed inside the first accommodating chamber 11. The movable contact sheet 53 is disposed above the annular coil 51. One end of the spring 54 is fixedly connected to an inner wall of the contactor body 1, and the other end of the spring 54 is fixedly connected to one end of the movable iron core 52. One end of the movable iron core 52 is fixedly connected to the movable contact sheet 53 and the other end of the movable iron core 52 is disposed in a cavity inside the annular coil 51.

The movable iron core 52 can move after the annular coil 51 is energized, so as to bring the movable contact sheet 53 to connect one end of the current splitter 4 with a first conductive piece; after the annular coil is de-energized 51, the movable iron core 52 can be reset by using an elastic force of the spring 54 to cut off the connection, thus helping to control one end of the current splitter 4 to be connected or disconnected with the first conductive piece.

An insulation plate 56 is further disposed between the annular coil 51 and the movable contact sheet 53. The insulation plate 56 is fixedly connected with a sidewall of the first accommodating chamber 11. The other end of the movable iron core 52 penetrates through the insulation plate 56 and is disposed in the cavity inside the annular coil 51. An elastic piece 55 is further disposed at a side of the insulation plate 56 close to the movable contact sheet 53.

When the current of the annular coil 51 is cut off, the movable iron core 52 can be reset under the elastic force of the spring 54 and the movable contact sheet 53 also can be reset quickly; with disposal of the elastic piece 55, the movement of the movable contact sheet 53 can be buffered, avoiding strong impact; the insulation plate 56, on the one hand, achieves supporting effect on the elastic piece 55, on the other hand, prevents the movable contact sheet 53 from resetting to strongly impact the annular coil 51. In this way, short-circuiting resulting from the coming-off of the paint on the surface of the annular coil 51 can be avoided.

In this embodiment, inside the circuit board 6 are disposed a collection circuit for collecting a current of the current splitter 4, a threshold current setting circuit for setting a threshold current, a power supply circuit, a control circuit for controlling the power supply circuit to connect with the electromagnetic system 5, and a main control chip U1 for processing signals. The collection circuit, the threshold current setting circuit and the control circuit are all electrically connected to the main control chip U1 which is electrically connected to the power supply circuit.

The main control chip U1 compares the current value collected by the collection circuit with the threshold current of the threshold current setting circuit to determine whether the electromagnetic system works, and hence further connect or disconnect the first conductive piece 2 and the second conductive piece 3, helping turn on or off the intelligent contactor by setting different thresholds for different currents.

The collection circuit comprises an amplifier U3, a slide rheostat RS1, a resistor R7, a resistor R8, a resistor R9, a resistor R10, a resistor R11, a capacitor C6 and a capacitor C5.

One end of the current splitter 4 is electrically connected to a grounding end, and the other end of the current splitter 4 is electrically connected to a non-inverting input end of the amplifier U32 through the resistor R10. The non-inverting input end of the amplifier U3 is electrically connected to a power supply end of the main control chip U1 through the resistor R11, and also electrically connected with the grounding end through the capacitor C6. An inverting input end of the amplifier U3 is electrically connected to the grounding end through the resistor R8 and also series-connected with the resistor R7 and the slide rheostat RS1 to electrically connect with an output end of the amplifier U3. A pin at a slide end of the slide rheostat RS1 is electrically connected to a fixed pin of one end of the slide rheostat RS1. The output end of the amplifier U3 is series-connected with the resistor R9 to electrically connect with the main control chip U1. The resistor R9 and a connection end of the main control chip U1 are electrically connected to the grounding end through the capacitor C5.

By using the amplifier U3, the data of the current splitter 4 can be collected in an amplifying way to help the comparison of the main control chip U1.

The threshold current setting circuit comprises a slide rheostat RS2 and a capacitor C7. A fixed pin at one end of the slide rheostat RS2 is electrically connected to a power supply end of the main control chip U1, and a fixed pin at the other end is electrically connected to a grounding end. A pin at a slide end of the slide rheostat RS2 is electrically connected to the main control chip U1, and the capacitor C7 is parallel-connected between the pin at the slide end of the slide rheostat RS2 and the grounding end.

The power supply circuit comprises a voltage regulating chip U2, a power supply IC U5, a fusible resistor FR1, a capacitor C3, a capacitor C4, a capacitor EC1, and a capacitor RC2.

The power input end is series-connected with the fusible resistor FR1 to electrically connect with an input end of the voltage regulating chip U2, and the input end of the voltage regulating chip U2 is grounded via the capacitor C3. An output end of the voltage regulating chip U2 is grounded via the capacitor EC1, and also electrically connected to a positive pole end of the power supply IC U5. A negative pole end of the power supply IC U5 is grounded. The output end of the power supply IC U5 is electrically connected to the power supply end of the main control chip U1. A zero potential end of the power supply IC U5 is electrically connected to the grounding end. A capacitor EC2 and the capacitor C4 are parallel-connected between the output end and the zero potential end of the power supply IC U5.

The control circuit comprises an optical coupler U4, a diode D1, a transient diode D2, a Zener diode ZD1, a PMOS transistor M1, a capacitor C1, a capacitor C2, a resistor R1, a resistor R2 and a resistor R3.

A power input end of the power supply circuit is electrically connected to a source electrode of the PMOS transistor M1; the source electrode of the PMOS transistor M1 is electrically connected to a negative pole of the transient diode D2; a positive pole of the transient diode D2 is grounded; the transient diode D2 is parallel-connected with the capacitor C2; the source electrode of the PMOS transistor M1 is electrically connected to a negative pole of the Zener diode ZD1; a positive pole of the Zener diode ZD1 is electrically connected with a gate electrode of the PMOS transistor M1; the Zener diode ZD1 is parallel-connected with the resistor R1; the gate electrode of the PMOS transistor M1 is electrically connected with a collector electrode of the optical coupler U4 through the resistor R2; an emitter electrode of the optical coupler U4 is grounded; a positive pole of the optical coupler U4 is electrically connected to a power supply end of the main control chip U1; a negative pole of the optical coupler U4 is electrically connected to the main control chip U1 through the resistor R3; a drain electrode of the PMOS transistor M1 is electrically connected to one end of the annular coil 51; the drain electrode of the PMOS transistor M1 is electrically connected to a negative pole of the diode D1; a positive pole of the diode D1 is grounded; the diode D1 is parallel-connected with the capacitor C1; and the other end of the annular coil 51 is grounded.

With the optical coupler and the PMOS transistor, the main control chip U1 can output signals to control the power supply of the power supply circuit to be connected to the annular coil 51 or not, bringing convenience to the control.

In this embodiment, an indication circuit for indicating that the current collected by the current splitter exceeds the threshold current is disposed in the circuit board 6. The indication circuit comprises a light-emitting diode LED 1 and a resistor R6. The power supply end of the main control chip U1 is series-connected with the resistor R6 and the light-emitting diode LED1 to electrically connect with the main control chip U1.

Specifically, the light-emitting diode LED1 is fixed on the circuit board 6 while the contactor body 1 is disposed as transparent structure. Alternatively, the light-emitting diode LED1 is embedded into a shell of the contactor body 1.

The beneficial effects of the present invention are as follows: the current splitter 4, the circuit board 6 and the electromagnetic system 5 are fixedly disposed inside the contactor body 1; a current flowing between the first conductive piece 2 and the second conductive piece 3 on the contactor body 1 is collected by using the current splitter 4; the circuit board 6 then controls the electromagnetic system 5 to be turned on or off based on a current value collected by the current splitter 4, thereby achieving automatic overcurrent cutoff and protecting a load circuit.

The above descriptions illustrate several preferred embodiments of the present invention. As mentioned above, it should be understood that the present invention is not limited to the forms disclosed herein and shall not be understood as exclusion to other embodiments but can be applied to various other combinations, modifications and environments and can be changed with the above teachings or the technologies or knowledge in the related arts within the scope conceived by the present invention. Any changes and modifications made by those skilled in the arts within the scope and spirit of the present invention shall all fall within the scope of protection claimed by the claims of the present invention.

Although disclosed as above, the scope of protection of the present invention is not limited hereto. Those skilled in the arts can make various changes and modifications within the spirit and scope of the present invention, and these changes and modifications fall within the scope of protection of the present invention.

The invention claimed is:

1. An intelligent contactor, comprising a contactor body (1), wherein the contactor body (1) is provided with a first conductive piece (2) and a second conductive piece (3) partially protruding out of the contactor body (1);

the contactor body (1) is provided with:

a current splitter (4) for measuring a current flowing through the first conductive piece (2) and the second conductive piece (3);

an electromagnetic system (5) for controlling one end of the current splitter (4) to be connected or disconnected with the first conductive piece (2), wherein the other end of the current splitter (4) is electrically connected to the second conductive piece (3); and a circuit board (6) for controlling the electromagnetic system (5) to be turned on or off based on a current value measured by the current splitter;

a partition plate is vertically and fixedly connected inside the contactor body (1), and the partition plate is used to partition the interior of the contactor body (1) into a first accommodation chamber (11) for accommodating and fixing the electromagnetic system (5) and a second accommodating chamber (12) for accommodating and fixing the circuit board (6); and a screw (7) is disposed on the contactor body (1), and the screw (7) penetrates through the contactor body (1) to be fixedly connected with one end of the current splitter (4); the second conductive piece (3) penetrates through the other end of the current splitter (4) and fixes the other end of the current splitter (4) inside the contactor body (1).

2. The intelligent contactor of claim 1, wherein a third sealing gasket (71) for fixing the screw (7) to the contactor body (1) is sleeved on the screw (7).

3. The intelligent contactor of claim 1, wherein the electromagnetic system (5) comprises an annular coil (51) in electrical connection with the circuit board (6), a movable iron core (52), a movable contact sheet (53) for controlling one end of the current splitter (4) to be connected or disconnected with the first conductive piece (2), and a spring (54); the annular coil (51) is fixed inside the first accommodating chamber (11); the movable contact sheet (53) is disposed above the annular coil (51); one end of the spring (54) is fixedly connected to an inner wall of the contactor body (1), and the other end of the spring (54) is fixedly connected to one end of the movable iron core (52); one end of the movable iron core (52) is fixedly connected to the movable contact sheet (53) and the other end of the movable iron core (52) is disposed in a cavity inside the annular coil (51).

4. The intelligent contactor of claim 3, wherein an insulation plate (55) is further disposed between the annular coil (51) and the movable contact sheet (53); the insulation plate (55) is fixedly connected with a sidewall of the first accommodating chamber (11); the other end of the movable iron core (52) penetrates through the insulation plate (55) and is disposed in the cavity inside the annular coil (51); an elastic piece (56) is further disposed at a side of the insulation plate (55) close to the movable contact sheet (53).

5. The intelligent contactor of claim 3, wherein inside the circuit board (6) are disposed a collection circuit for collecting a current of the current splitter (4), a threshold current setting circuit for setting a threshold current, a power supply circuit, a control circuit for controlling the power supply circuit to connect with the electromagnetic system (5), and a main control chip U1 for processing signals; the collection circuit, the threshold current setting circuit and the control circuit are all electrically connected to the main control chip U1 which is electrically connected to the power supply circuit.

6. The intelligent contactor of claim 5, wherein the collection circuit comprises an amplifier U3, a slide rheostat RS1, a resistor R7, a resistor R8, a resistor R9, a resistor R10, a resistor R11, a capacitor C6 and a capacitor C5; one end of the current splitter (4) is electrically connected to a grounding end, and the other end of the current splitter (4) is electrically connected to a non-inverting input end of the amplifier U32 through the resistor R10; the non-inverting input end of the amplifier U3 is electrically connected to a power supply end of the main control chip U1 through the resistor R11, and also electrically connected with the grounding end through the capacitor C6; an inverting input end of the amplifier U3 is electrically connected to the grounding end through the resistor R8 and also series-connected with the resistor R7 and the slide rheostat RS1 to electrically connect with an output end of the amplifier U3; a slide end pin of the slide rheostat RS1 is electrically connected to a fixed pin of one end of the slide rheostat RS1; the output end of the amplifier U3 is series-connected with the resistor R9 to electrically connect with the main control chip U1; the resistor R9 and a connection end of the main control chip U1 are electrically connected to the grounding end through the capacitor C5.

7. The intelligent contactor of claim 5, wherein the control circuit comprises an optical coupler U4, a diode D1, a transient diode D2, a Zener diode ZD1, a PMOS transistor M1, a capacitor C1, a capacitor C2, a resistor R1, a resistor R2 and a resistor R3; a power input end of the power supply circuit is electrically connected to a source electrode of the PMOS transistor M1; the source electrode of the PMOS transistor M1 is electrically connected to a negative pole of the transient diode D2; a positive pole of the transient diode D2 is grounded; the transient diode D2 is parallel-connected with the capacitor C2; the source electrode of the PMOS transistor M1 is electrically connected to a negative pole of the Zener diode ZD1; a positive pole of the Zener diode ZD1 is electrically connected with a gate electrode of the PMOS transistor M1; the Zener diode ZD1 is parallel-connected with the resistor R1; the gate electrode of the PMOS transistor M1 is electrically connected with a collector electrode of the optical coupler U4 through the resistor R2; an emitter electrode of the optical coupler U4 is grounded; a positive pole of the optical coupler U4 is electrically connected to a power supply end of the main control chip U1; a negative pole of the optical coupler U4 is electrically connected to the main control chip U1 through the resistor R3; a drain electrode of the PMOS transistor M1 is electrically connected to one end of the annular coil (51); the drain electrode of the PMOS transistor M1 is electrically connected to a negative pole of the diode D1; a positive pole of the diode D1 is grounded; the diode D1 is parallel-connected with the capacitor C1; and the other end of the annular coil (51) is grounded.

8. The intelligent contactor of claim 1, wherein a first flat washer (21), a first spring washer (22) and a first nut (23) are sequentially sleeved on the first conductive piece (2) outside the contactor body (1), and the first nut (23) is thread-connected with the first conductive piece (2); a second flat washer (31), a second spring washer (32) and a second nut (33) are sequentially sleeved on the second conductive piece (3) outside the contactor body (1), and the second nut (33) is thread-connected with the second conductive piece (3).

9. The intelligent contactor of claim 8, wherein a first sealing gasket (24) for fixing the first flat washer (21) to the contactor body (1) is sleeved on the first conductive piece (2) and a second sealing gasket (34) for fixing the second flat washer (31) to the contactor body (1) is sleeved on the second conductive piece (3).

* * * * *